(12) United States Patent  (10) Patent No.: US 12,489,642 B2
Urban et al.  (45) Date of Patent: Dec. 2, 2025

(54) IDENTITY BASED HIERARCHICAL SESSIONS

(71) Applicant: INTERNATIONAL BUSINESS MACHINES CORPORATION, Armonk, NY (US)

(72) Inventors: Volker Urban, Böblingen (DE); Tamas Visegrady, Zurich (CH); Reinhard Theodor Buendgen, Tuebingen (DE); Michael D. Hocker, Staatsburg, NY (US); Eric David Rossman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 18/354,991

(22) Filed: Jul. 19, 2023

(65) Prior Publication Data

US 2024/0396747 A1   Nov. 28, 2024

(30) Foreign Application Priority Data

May 24, 2023   (GB) ...................................... 2307761

(51) Int. Cl.
*H04L 29/06* (2006.01)
*H04L 9/08* (2006.01)
(Continued)

(52) U.S. Cl.
CPC .......... *H04L 9/3271* (2013.01); *H04L 9/0841* (2013.01); *H04L 9/3073* (2013.01); *H04L 63/105* (2013.01)

(58) Field of Classification Search
None
See application file for complete search history.

(56) References Cited

U.S. PATENT DOCUMENTS

| 4,494,189 A | 1/1985 | Bean |
| 5,535,416 A | 7/1996 | Feeney |

(Continued)

FOREIGN PATENT DOCUMENTS

| CN | 101044489 A | 9/2007 |
| CN | 103701607 A | 4/2014 |

(Continued)

OTHER PUBLICATIONS

Fisher-Ogden, John, "Hardware Support for Efficient Virtualization," University of California, San Diego, Tech. Rep. 12, 2006 (no further date information available), pp. 1-12.

(Continued)

*Primary Examiner* — Jeffery L Williams
(74) *Attorney, Agent, or Firm* — Anthony Curro

(57) ABSTRACT

According to one embodiment, a method, computer system, and computer program product for establishing identity-based hierarchical sessions on a hardware security module (HSM) for binding secure keys to a guest system, is disclosed. The present invention may include establishing a communication channel between the guest system and the HSM, wherein the communication channel is identity-based, end-to-end and encrypted, thereby establishing a session, transferring login information of the guest system through the communication channel to the HSM, maintaining a predefined security level throughout a hierarchy of the sessions, wherein no child session has a higher security level than its parent session, and performing a challenge-response protocol based on a session ownership verification with the guest, such that an HSM generated and secured key is bound to a related session.

20 Claims, 5 Drawing Sheets

(51) Int. Cl.
  *H04L 9/30* (2006.01)
  *H04L 9/32* (2006.01)
  *H04L 9/40* (2022.01)

(56) References Cited

U.S. PATENT DOCUMENTS

| | | | |
|---|---|---|---|
| 6,453,392 | B1 | 9/2002 | Flynn, Jr. |
| 7,143,287 | B2 | 11/2006 | Bade |
| 7,639,819 | B2 | 12/2009 | Ho |
| 8,826,039 | B2 | 9/2014 | Chou |
| 9,578,017 | B2 | 2/2017 | Ferguson |
| 9,720,721 | B2 | 8/2017 | Bacher |
| 9,767,293 | B2 | 9/2017 | Boenisch |
| 9,836,308 | B2 | 12/2017 | Boenisch |
| 9,928,080 | B2 | 3/2018 | Boenisch |
| 10,284,534 | B1 | 5/2019 | Perlman |
| 10,771,263 | B2 | 9/2020 | Smith |
| 11,023,619 | B2 | 6/2021 | Buendgen |
| 11,500,988 | B2 | 11/2022 | Buendgen |
| 11,533,174 | B2 | 12/2022 | Buendgen et al. |
| 2009/0110191 | A1 | 4/2009 | Sanvido |
| 2011/0246785 | A1 | 10/2011 | Linsley |
| 2011/0302400 | A1* | 12/2011 | Maino .............. H04L 9/0825 713/189 |
| 2012/0179909 | A1 | 7/2012 | Sagi |
| 2016/0239667 | A1 | 8/2016 | Boenisch |
| 2016/0241393 | A1 | 8/2016 | Boenisch et al. |
| 2018/0332011 | A1 | 11/2018 | Gray |
| 2019/0296896 | A1* | 9/2019 | Resch .............. H04L 9/0656 |
| 2019/0296897 | A1* | 9/2019 | Resch .............. H04L 9/0897 |
| 2019/0297064 | A1* | 9/2019 | Resch .............. H04L 9/3271 |
| 2019/0356475 | A1* | 11/2019 | Resch .............. H04L 9/085 |
| 2019/0392143 | A1 | 12/2019 | Hall |
| 2020/0053065 | A1 | 2/2020 | Wisniewski |
| 2020/0067698 | A1* | 2/2020 | Schmatz ............ H04L 9/0894 |
| 2020/0089916 | A1 | 3/2020 | Buendgen |
| 2020/0169401 | A1 | 5/2020 | Dooley |
| 2020/0228351 | A1 | 7/2020 | Kreft |
| 2020/0266982 | A1* | 8/2020 | Schmatz ............ H04L 9/0631 |
| 2020/0285746 | A1* | 9/2020 | Buendgen ........... G06F 21/44 |
| 2021/0232709 | A1* | 7/2021 | Buendgen ........... G06F 21/602 |
| 2021/0234681 | A1* | 7/2021 | Buendgen ........... H04L 9/0897 |
| 2022/0393857 | A1* | 12/2022 | Anand ............... H04L 63/102 |
| 2023/0031297 | A1 | 2/2023 | Buendgen |
| 2023/0131348 | A1* | 4/2023 | Landerholm ........ H04L 9/0877 713/168 |
| 2023/0318826 | A1* | 10/2023 | Anand ............... H04L 9/14 380/286 |
| 2024/0154799 | A1* | 5/2024 | Berzati ............. G06F 21/602 |
| 2024/0396747 | A1* | 11/2024 | Urban .............. H04L 9/0877 |
| 2025/0004700 | A1* | 1/2025 | Woo ................ G06F 3/165 |

FOREIGN PATENT DOCUMENTS

| | | | |
|---|---|---|---|
| CN | 103368973 B | 2/2016 | |
| CN | 114930328 A | 8/2022 | |
| DE | 112020005625 T5 | 9/2022 | |
| EP | 3913850 A1 * | 11/2021 | ............. H04L 63/06 |
| GB | 2607794 A | 12/2022 | |
| GB | 2630336 A | 11/2024 | |
| JP | 2023-511834 A | 3/2023 | |
| WO | 2011015626 A1 | 2/2011 | |
| WO | WO-2011156261 A1 * | 12/2011 | ............. G06F 21/72 |
| WO | 2018218349 A1 | 12/2018 | |
| WO | 2021/152383 A1 | 8/2021 | |
| WO | 2023076905 A1 | 5/2023 | |
| WO | 2024/240499 A1 | 11/2024 | |

OTHER PUBLICATIONS

Gum, P. H., "System/370 Extended Architecture: Facilities for Virtual Machines," IBM J. Res. Develop., vol. 27, No. 6, Nov. 1983, pp. 530-544.

Hughes, James et al., "Transparent Multi-core Cryptographic Support on Niagara CMT Processors," Second International Workshop on Multicore Software Engineering, May 2009, pp. 1-8.
IBM, "z/Architecture—Principles of Operation," IBM Publication No. SA22-7832-11, Twelfth Edition, Sep. 2017, pp. 1-1902.
International Search Report and Written Opinion, PCT/IB2020/061733, Mar. 23, 2021, pp. 1-8.
Klimm, Alexander et al., "An Adaptive and Scalable Multiprocessor System For Xilinx FPGAs Using Minimal Sized Processor Cores," 2008 IEEE International Symposium on Parallel and Distributed Processing, Apr. 2008, pp. 1-7.
Lal, Shankar et al., "Securing VNF Communication in NFVI," 2017 IEEE Conference on Standards for Communications and Networking (CSCN), Sep. 2017, pp. 187-192.
Le Vinh, Thinh et al., "Trusted Platforms to Secure Mobile Cloud Computing," 2014 IEEE International Conference on High Performance Computing and Communications, 2014 IEEE 6th International Symposium on Cyberspace Safety and Security, 2014 IEEE 11th International Conference on Embedded Software and System (HPCC,CSS,ICESS), Aug. 2014, pp. 1-8.
Mell, Peter and Tim Grance, "The NIST Definition of Cloud Computing," National Institute of Standards and Technology, Information Technology Laboratory, Special Publication 800-145, Sep. 2011, pp. 1-7.
Intellectual Property Office, Patents Act 1977: Examination Report under Section 18(3), Apr. 14, 2025, 5 Pages, GB Application No. 2212344.2.
IBM: List of IBM Patents or Patent Applications Treated as Related (Appendix P), Nov. 28, 2023, 2 pages.
Intellectual Property Office, "Patents Act 1977: Search Report under Section 17(5)," Intellectual Property Office, Nov. 17, 2023, 4 pages, GB No. GB2307761.3.
Japanese Patent Office, "Notice of Reasons for Refusal," Japanese Patent Office, May 20, 2024, 4 pages, JP Patent Application No. 2022-539306, Machine Translated.
Reply to the UK examination report dated Apr. 14, 2024, Application No. GB 2212344.2, 3 pages.
International Searching Authority, "Notification of Transmittal of the International Search Report and the Written Opinion of the International Searching Authority, or Declaration," Patent Cooperation Treaty, Jul. 19, 2024, 12 pages, International Application No. PCT/EP2024/062716.
Disclosed Anonymously, "Method for Optimized Batch Cryptographic Deletion Utilizing a Hardware Security Module and Tree-Based Encryption Key Management," IP.com, Nov. 17, 2021, 8 pages, IP.com No. IPCOM000267727D, Retrieved from the Internet: <URL: https://priorart.ip.com/IPCOM/000267727>.
Disclosed Anonymously, "NHIP—Network Hosts Identity Protocol," IP.com, Jun. 10, 2020, 3 pages, IP.com No. IPCOM000262549D, Retrieved from the Internet: <URL: https://priorart.ip.com/IPCOM/000262549>.
Disclosed Anonymously, "System and Method to Use Hybrid Data Encryption Keys for Data-at-Rest Encryption in Cloud," IP.com, Feb. 1, 2021, 4 pages, IP.com No. IPCOM000264856D, Retrieved from the Internet: <URL: https://priorart.ip.com/IPCOM/000264856>.
Eisele, "Introducing Hardware Security Modules to Embedded Systems for Electric Vehicles charging according to ISO/IEC 15118," Datasheet [online], Vector Informatik GmbH, Mar. 17, 2017, 19 pages, Retrieved from the Internet: <URL: https://cdn.vector.com/cms/content/events/2017/EMOB17/Vector_EMOB_2017_Phanuel_Hieber.pdf>.
Han, et al., "Toward Scaling Hardware Security Module for Emerging Cloud Services," SysTEX '19: Proceedings of the 4th Workshop on System Software for Trusted Execution [research article], Oct. 2019, 6 pages, Article No. 3, ACM Digital Library, Huntsville, ON, CA, DOI: 10.1145/3342559.3365335, Retrieved from the Internet: <URL: https://dl.acm.org/doi/10.1145/3342559.3365335>.
Kallewoof, "bips/bip-0032.mediawiki," Github [online], 2021 [accessed on Jul. 11, 2023], 11 pages, Retrieved from the Internet: <URL: https://github.com/bitcoin/bips/blob/master/bip-0032.mediawiki>.
NXP Semiconductors, et al., "i.MX 8X SECO HSMv2 FIPS 140-2 Non-Proprietary Security Policy Document Version 2.0," Datasheet

(56) References Cited

OTHER PUBLICATIONS

[online], Feb. 7, 2022, 16 pages, Retrieved from the Internet: <URL: https://csrc.nist.gov/CSRC/media/projects/cryptographic-module-validation-program/documents/security-policies/140sp4152.pdf>.

Pitney Bowes, "X4i Hardware Security Module (HSM) FIPS 140-2 Non-Proprietary Security Policy," Datasheet [online], Pitney Bowes, Inc., 2020 [accessed on Jul. 11, 2023], 25 pages, Retrieved from the Internet: <URL: https://csrc.nist.gov/CSRC/media/projects/cryptographic-module-validation-program/documents/security-policies/140sp3830.pdf>.

Urban, et al., "Identity Based Hierarchical Sessions," Application and Drawings, Filed on May 24, 2023, 38 Pages, Related GB Patent Application Serial No. 2307761.3.

Wikipedia, "Password-authenticated key agreement", Wikipedia, the free encyclopedia, [accessed on Jul. 11, 2023], 4 Pages, Retrieved from the Internet: <URL: https://en.wikipedia.org/wiki/Password-authenticated_key_agreement>.

\* cited by examiner

IDENTITY BASED HIERARCHICAL SESSIONS

BACKGROUND

The present invention relates, generally, to a secure session management method, and more specifically, to establishing identity-based hierarchical sessions on a hardware security module ("HSM") for binding secure keys to a guest system. The present invention relates further to a session management system for establishing identity-based hierarchical sessions on a hardware security module for binding secure keys to a guest system, and a computer program product.

Data security, comprising both physical and virtual communication lines, remains one of the top priorities for the management of information technology ("IT") companies. This is because data security is not only important due to existing laws and regulations, such as GDPR, EU General Data Protection Regulation, etc., but also due to a potential loss of credibility if a company fails to reliably protect customer data at all times. As a result, the potential for lost sales and profits exists in the event of compromised customer data records. Data protection and the provision of secure computing platforms are not only limited to software but can involve hardware modules as well. Yet, mass-market CPU chips used in microcontrollers, personal computers, mobile phones, or home automation devices, may not normally be used in applications involving data protection and the provision of secure computing platforms. However, for highly trusted enterprise-class computing environments, such as those used in the financial, insurance industries, or government organizations, it is essential to be able to demonstrate that data breaches have a very high probability of being prevented from a technological perspective. Thus, the prevention of data breaches may require some additional high-tech components and sophisticated software processes for an associated increased success in terms of data security.

SUMMARY

According to one embodiment of the present invention, a method, computer system, and computer program product for establishing identity-based hierarchical sessions on a hardware security module for binding secure keys to a guest system may be provided. The present invention may comprise establishing a communication channel between the guest system and the HSM, wherein the communication channel is identity-based, end-to-end, and encrypted, thereby establishing a session, transferring login information of the guest system through the communication channel to the HSM, and maintaining a predefined security level throughout a hierarchy of the sessions. Thereby, no child session may have a higher security level than its parent session. The present invention may additionally comprise performing a challenge-response protocol based on a session ownership verification with the guest, such that an HSM-generated and secured key is bound to an associated session.

According to another aspect of the present invention, a session management system for establishing identity-based hierarchical sessions on a hardware security module for binding secure keys to a guest system may be provided. The system may comprise one or more processors and a memory operatively coupled to the one or more processors, wherein the memory stores program code portions which, when executed by the one or more processors, enable the one or more processors to establish a communication channel between the guest system and the HSM, wherein the communication channel is identity-based, end-to-end and encrypted, thereby establishing a session, to transfer login information of the guest system through the communication channel to the HSM, and to maintain a predefined security level throughout a hierarchy of the sessions. Thereby, no child session may have a higher security level than its associated session.

Furthermore, the present invention may comprise performing a challenge-response protocol based on a session ownership verification with the guest system, such that an HSM-generated and secured key is bound to an associated session.

BRIEF DESCRIPTION OF THE SEVERAL VIEWS OF THE DRAWINGS

It should be noted that embodiments of the invention are described with reference to different subject matters. In particular, some embodiments are described with reference to method-type claims, whereas other embodiments are described with reference to apparatus-type claims. However, a person skilled in the art will gather from the above and the following description that, unless otherwise notified, in addition to any combination of features belonging to one type of subject matter, also any combination between features relating to different subject matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments to which the invention is not limited.

Figure 1:
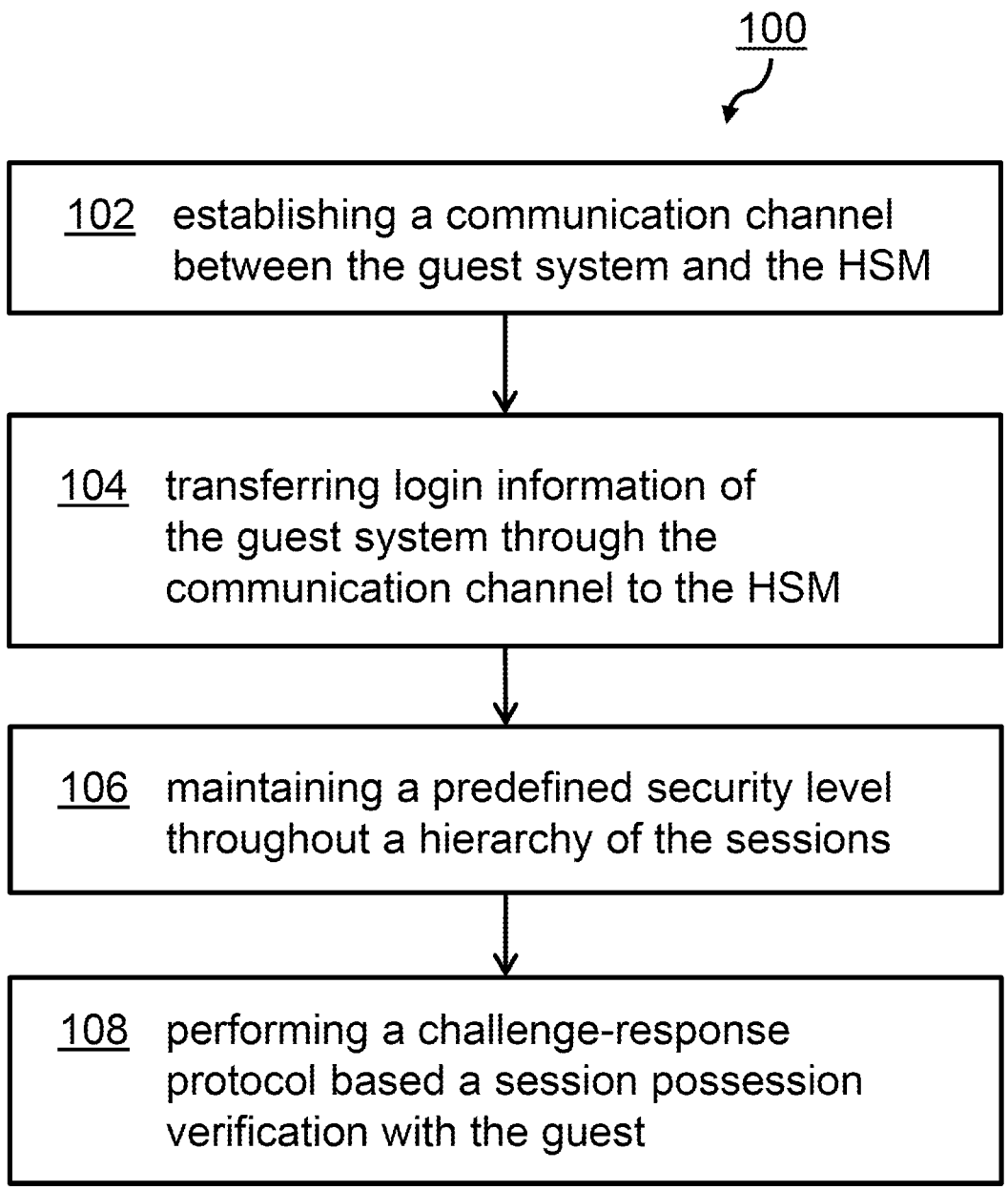
Figure 2:
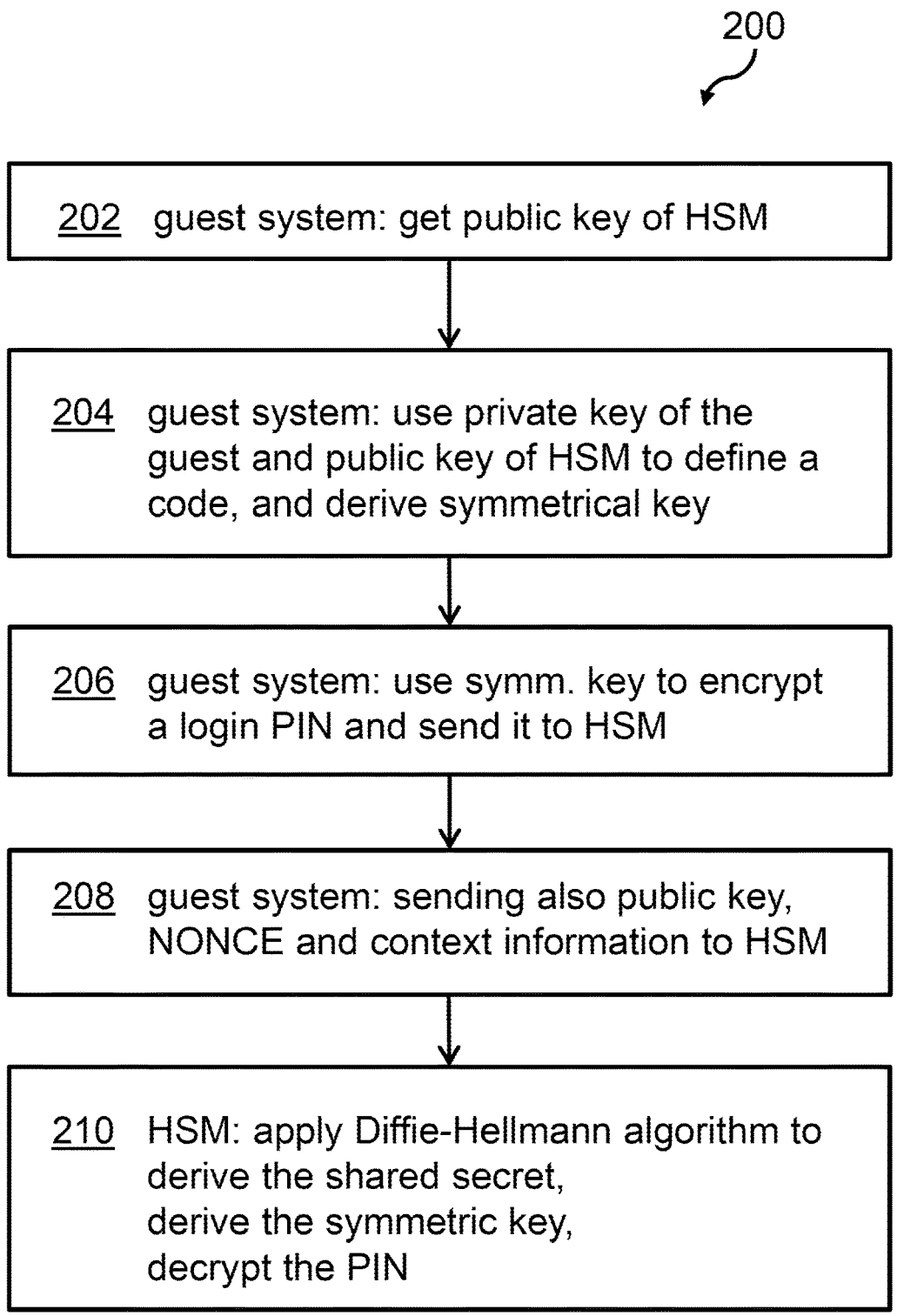
Figure 3:
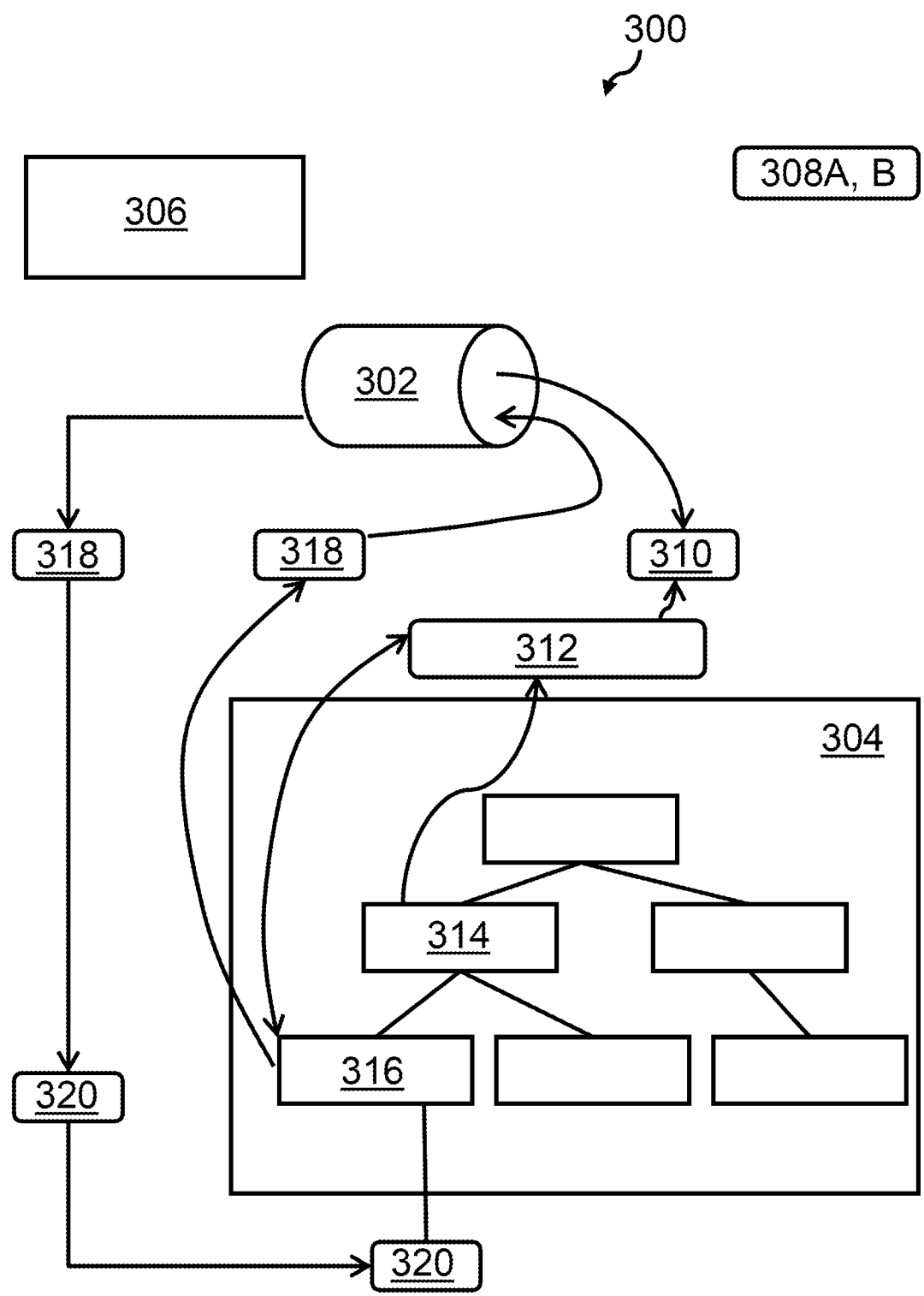
Figure 4:
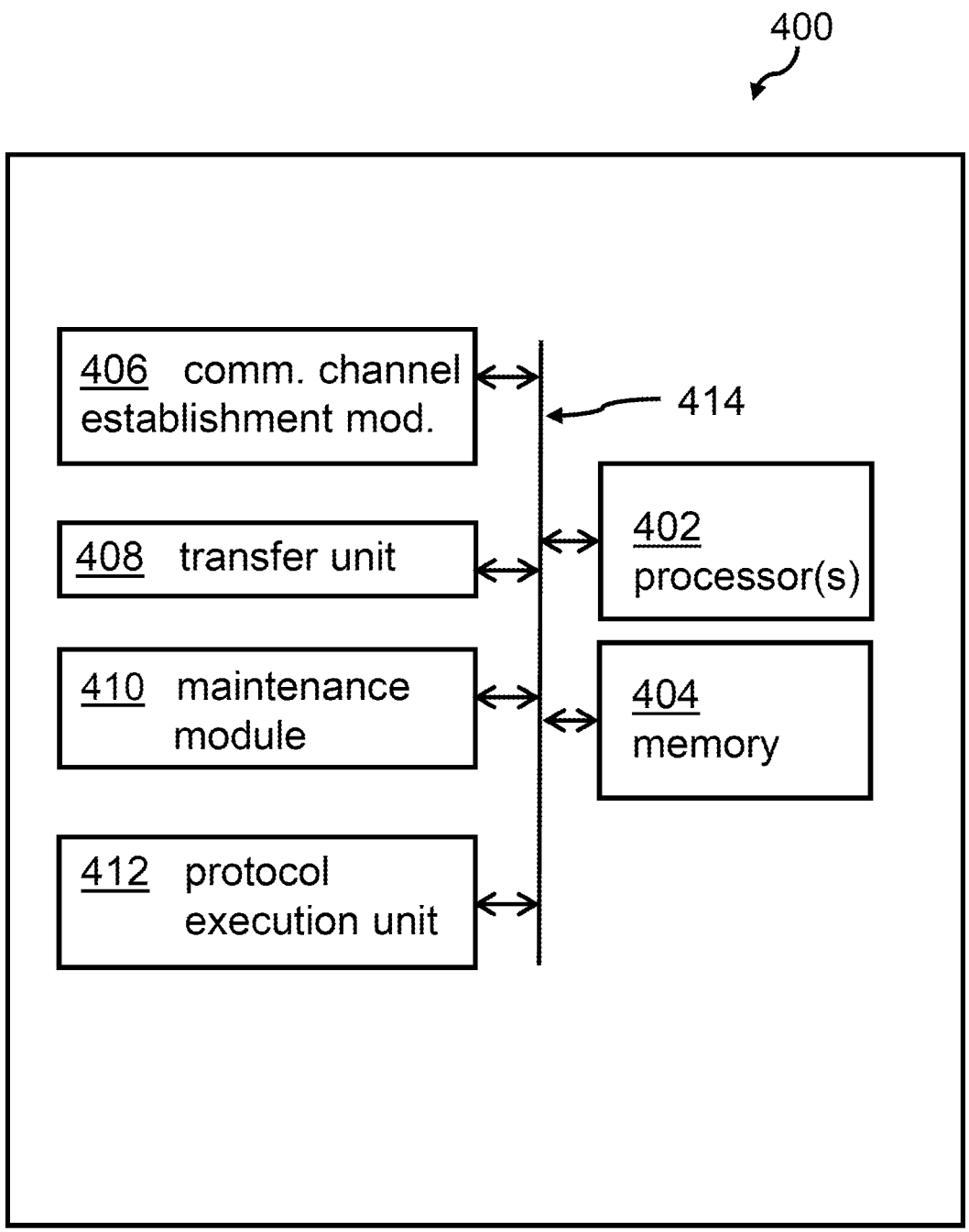
Figure 5:
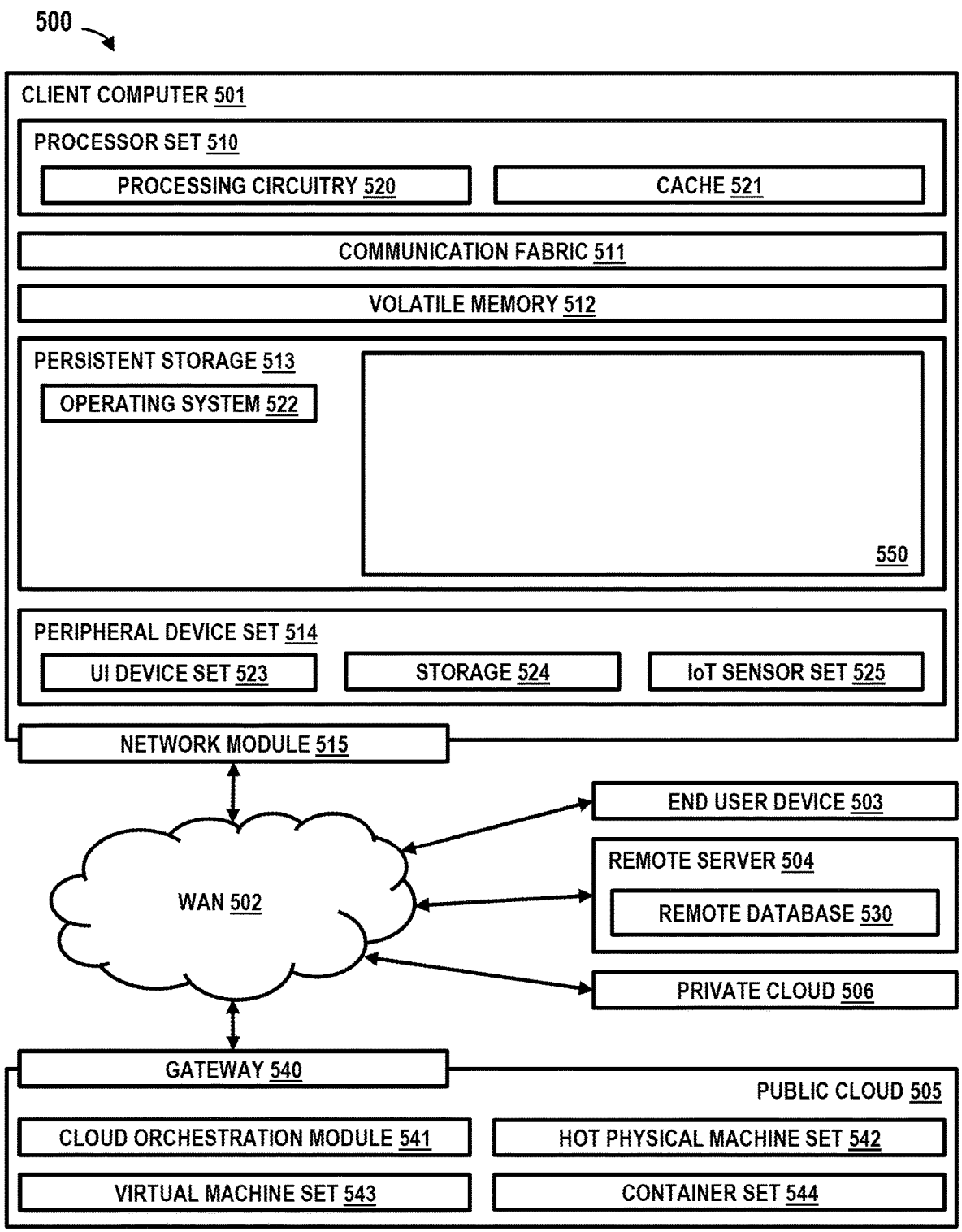

Preferred embodiments of the invention will be described, by way of example only, and with reference to the following drawings:

FIG. 1 illustrates a block diagram of a flowchart of an embodiment of the inventive computer-implemented method for establishing identity-based hierarchical sessions on a hardware security module for binding secure keys to a guest system, according to at least one embodiment;

FIG. 2 illustrates a block diagram of a flowchart embodiment of establishing the secure communication channel, according to at least one embodiment;

FIG. 3 illustrates a block diagram of an embodiment of an interaction between the client, the communication channel, and the hierarchical session/identity assignment, according to at least one embodiment;

FIG. 4 illustrates a block diagram of an embodiment of the inventive components of the session management system for establishing identity-based hierarchical sessions on a hardware security module for binding secure keys to a guest system, according to at least one embodiment; and FIG. 5 illustrates an exemplary networked computer environment according to at least one embodiment.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Presently, various methods exist that are related to establishing identity-based hierarchical sessions on a hardware security module for binding secure keys to a guest system. For example, one current method discloses changing cryptographic keys in high-frequency transaction environments to mitigate service disruption or loss of transactions associated with key maintenance. Furthermore, a server device may employ a working key encrypted with the first master key to decrypt messages transmitted by a client device, where each message is encrypted with eight first cryptograms generated based on the working key encrypted with a first master key. Additionally, another current method discloses a database system for implementing a key management system with a database starring encryption keys or other secrets. A set of hardware security modules ("HSMs") may identify the first key encryption key and a second key encryption key stored in the set of HSMs. Furthermore, the set of HSMs may retrieve, from the database, a set of encryption keys encrypted by the first key encryption key and decrypt each encrypted key of the set of encryption keys using the first key encryption key.

Although HSMs have been in use for quite some time, synchronizing their association to specific sessions of guest systems and other software components that use the HSMs' service remains troublesome. One disadvantage of current methods is that an association with certain sessions may not be provided. Therefore, there exists a need to overcome the deficiencies of current methods by improving the use of HSMs along with related guest systems.

The proposed computer-implemented method for establishing identity-based hierarchical sessions on a hardware security module for binding secure keys to a guest system, may offer multiple advantages, technical effects, contributions, and/or improvements.

Embodiments of the present invention may remedy the above-mentioned deficiencies/needs by establishing identity-based hierarchical sessions for binding secure keys to a secure guest system. The login information may be transferred through an identity-based end-to-end encrypted communication channel. The compliance level may be maintained throughout the hierarchy of sessions. No child session may be of a higher compliance level than its parent. The capability to deallocate the initial connection, i.e., common location tunnel, data, and state, i.e., status, after the challenge has been returned to the initiator session may allow the proposed method and system to be implemented in such a way that it can operate even with back ends comprising severe restrictions on internal persistent storage, such as more traditional architecture at computing systems.

In general, embodiments of the present invention can ensure that an HSM cannot be misused by a guest system other than the initiating one. The session, by which the guest system may create and use an HSM-created security key, may not be as disturbed or misused by any other session.

In doing so, maintaining the compliance-aware session hierarchy can bring benefits as follows: (i) the implemented module may use this session hierarchy information to check that the parent session is a valid and active session; (ii) the proposed module may verify that the security compliance level of the parent session may be higher or equal to the compliance level of the new child session; and (iii) if either check fails, the creation of the new session will be rejected such that no session can be initiated if the security standards are not met.

Furthermore, the challenge-response-based concept may enable additional advantages: (i) based on the login information in any potential additional context information provided by the initiator session, the proposed module may generate a challenge session token as well as the expected response session token; (ii) the challenge session token may be encrypted using the former derived encryption token and sent back to the initiator through the protected communication channel; (iii) only the original initiator session will be able to decrypt the challenge session token and to obtain the expected response session token; and (iv) the initiator session will present the response session token on each request to the module that requires a proof-of-possession authentication.

Furthermore, the deallocation of the initial data and state may enable additional advantages: (i) after a creation of the response session token and the encrypted challenge session token may have been sent to the initiator session, the proposed module will deallocate all initial connection data and state, i.e., status, for the sake of resource austerity; and (ii) only the subject key identifier ("SKI") of the initiators public key as well as the response session token will be retained for a later verification.

Thus, no session can be started or terminated without being compliant with the high and predefined security standards. This also means that sessions and tokens may not be intermixed and misused by any compromising activity. The system and the session communication between the guest system and a related HSM may be sealed, i.e., "tunneled", implying an end-to-end trusted relationship through mutual identifications of the participants. Moreover, this goal may be achieved with a comparably lean protocol with only little overhead when compared to a standard session management between a guest system and an HSM.

Additionally, using the concept of the hierarchical tree structure of the parent-child relationships of the sessions, it may also be advantageous to log out a complete branch of the session tree with a single action. Furthermore, supervisor sessions may allow for a log-out of all supervisor sessions at the same time. This may increase the security and liability of the chosen concept when compared to traditional solutions. The hierarchical grouping inherent in the proposed system may also provide scalability since the well-defined hierarchy of sessions may allow a compact representation of entire sub-hierarchies. By performing operations on sessions, one may imply operations on sessions beneath it, or implicit operations a session will perform in relationship to those above it.

In the following, additional embodiments of the present invention, applicable to the method as well as to the system and the computer program product, will be described.

According to at least one embodiment of the present invention, the method may further comprise transmitting a challenge of the challenge-response protocol via the communication channel from the HSM to the guest system. This may lead to a response to the received challenge from the guest system in order to identify itself as a correctly connected guest system.

According to at least one embodiment of the present invention, the establishing of the communication channel may be based on a public/private key pair of the HSM and a transmitted code, which may also be seen as a shared secret, enabling a symmetrical encryption/decryption key to be derived. A similar mechanism based on public and private key pairs may be used by other secure transmission protocols.

According to at least one embodiment of the present invention, the deriving of the symmetrical encryption/decryption key may be based on a Diffie-Hellman algorithm. The Diffie-Hellman algorithm requires little overhead with a solid security level. Additionally, other algorithms for deriving symmetrical encryption/decryption keys based on a shared secret may be used.

According to at least one embodiment of the present invention, the method may further comprise using the communication channel to configure a new session to be a child session of an existing session, such that the child session is cryptographically dependent on the parent session. This may require the existence of a parent session. Under this approach, the requirement that no child session may have a higher security level than its parent session can become manageable without requiring any additional overhead operations.

According to at least one embodiment of the present invention, the guest system may be executed on a hypervisor. Such a virtual operation approach may represent a typical use case for large computer systems, where a large plurality of guest systems may share common hardware resources. This may also enable a close interaction between trusted firmware on top of which the hypervisor may be operated, such that a secure communication may be established from the guest system via the hypervisor to the trusted firmware, and further to the HSM.

According to at least one embodiment of the present invention, a function of a firmware or trusted firmware of a computer system may facilitate a communication between the guest system and the HSM. Such a setup may be beneficial for the highest levels of computing and communication security.

According to at least one embodiment of the present invention, the method may further comprise deallocating the communication channel and a related state of the guest system and/or a related session. This may allow the termination of the binding between the HSM and the related guest system, which is necessary if the guest system is a virtual guest system. If the virtual guest system is to be terminated, the related binding to the HSM needs to be decommissioned or deallocated.

According to at least one embodiment of the present invention, the method may further comprise deallocating the session and a related state of the guest system, and/or deallocating all child sessions that have been associated with a parent session upon deallocation of the parent session.

According to at least one embodiment of the present invention, the method may further comprise marking a session as a supervisor session, and/or providing a separate interface for deallocating all sessions bound to the HSM and their child sessions that have been marked as a supervisor session. Such an embodiment can ease the management of the guest system sessions significantly.

According to at least one embodiment of the present invention, the method may further comprise upon determining that a child session has a lower security level than its targeted parent session, rejecting the request to open a child session. This may enable and support the hierarchical organization of the sessions, as described above, i.e., the method may comprise determining, during the establishing of the communication channel, that a child session may have a higher security level than its parent session.

According to at least one embodiment of the present invention, the session ownership verification may comprise generating a session token as well as an expected response token, decrypting a received encrypted session token, and deriving the received expected response token. Thereby, the protocol may succeed only if the expected response token and the derivation of the received expected response token are identical. Such a protocol may ensure one of the highest possible security levels.

Furthermore, embodiments of the present invention may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating, or transporting the program for use by or in connection, with the instruction execution system, apparatus, or device.

In the context of this description, the following technical conventions, terms, and/or expressions may be used:

The term "hardware security module" ("HSM") may denote a physical computing device that safeguards and manages digital keys, performs encryption and decryption functions of digital signatures, strong authentication, and other cryptographic functions. These modules traditionally come in the form of a plug-in card or an external device that attaches directly to a computer or network server. They may also comprise one or more secure crypto-processor chips. HSMs are typically used for managing, controlling and safeguarding security keys or master keys used in other components of a computer or network system. Although stored safely in the HSM, security protocols require that also such master keys are renewed from time to time, i.e., undergo a master key roll process.

The term "guest system" may denote a physical or virtual computer resource under control of an operating system or a hypervisor. The guest system may also be referred to as "guest" or be operated as a secure guest system. One typical implementation of this may be a virtual machine running an application. However, it may also be a system process or (optimally, network-attached) physical control unit.

The term "binding secure keys to a guest system" may denote that the secure key may only be used by and in conjunction with the dedicated guest system.

The term "communication channel" may denote a sequence of physical and logical components in a computer system enabled to be managed under predefined conditions and security protocols.

The term "identity-based" may denote that an access to a computer resource may be bound to a specific identifier. Another component that does not have information about the specific identifier may not access the resource. Additionally, if unauthorized access is attempted without permission, an alarm can be activated.

The term "end-to-end" may denote that a communication between two components A and B may not be disturbed or misused by a third component. If, e.g., a communication between A and B may be encrypted, no decryption option between A and B along a communication path may exist.

The term "encrypted" may denote the concept that no access to a plaintext may be possible unless a decryption key can be used to decipher the encrypted plaintext using known asymmetric and symmetric encryption/decryption concepts. Thereby, asymmetric encryption/decryption concepts rely on a combination of the public and a private key, whereas symmetric encryption/decryption keys are identical.

The term "session" may denote a collaboration between two components of a computer system, e.g., a guest system and an HSM. A session may have a starting point and an endpoint, i.e., it exists for a manageable period of time. During the session, the two different components may collaborate on manipulating or exchanging data.

The term "login information" may denote here at least a personal identification number ("PIN"). Additionally, optional login information or credentials can be a Nonce, i.e., a one-time secret code, and/or context information.

The term "predefined security level" may denote that, e.g., a communication may be compliant with a certain level of security standards.

The term "hierarchy of the sessions" may denote that starting from an original or initial session, there are additional sessions organized as leaves below the initial session. Thereby, child sessions of a parent session may also act as parent sessions themselves for subsequent child sessions.

The term "challenge-response protocol" may denote a concept by which a response may be compared with an expected response, i.e., two components A and B may be in communication action exchange. If component A sends out a challenge to component B and if component B generates the expected response, which, after transmission to component A, may be compared with the expected response, it may become clear that the two components are intended to collaborate.

The term "session possession ownership" may denote a concept by which the guest system demonstrates its ownership of the session by presenting the expected response token which only the guest system could have been able to derive from the challenge token retrieved through the end-to-end encrypted channel.

The term "Diffie-Hellman algorithm" may denote the known mathematical method of securely exchanging cryptographic keys over to a public channel by relying on a generated secret code derived from a combination of public and private key pair components. If the first and the second component A and B communicate with each other and if each component has its own private/public key pair ("pubK"/"privK"), the secret code may be generated by a combination of pubK-A and privK-B, as well as PrivK-A and pubK-B. Thus, both sides may generate the secret code independently of each other.

The term "hypervisor", also known as "virtual machine monitor", may denote a softer layer between the physical hardware of a computer system and an operating system. By the concept of virtualization using the hypervisor, a plurality of virtual machines may be operated atop the hypervisor on one single physical machine. The different virtual machines cannot and do not influence each other, apart from performance bottlenecks. The hypervisor may collaborate with the computer system in order to implement secure computing concepts.

The term "firmware of a computer system" may denote software code that may be deeply integrated into the hardware of a computer system and that may be executed by the process or any other computer code executing controllers. Typically, end-user programs may not access the firmware directly. The access may be restricted to operating systems and/or hypervisors.

The term "session token" may denote a secret code used by both sides of a session, i.e., component A and component B may both know the session token. Computing components outside the session may not have access to the session token. Thus, privacy and secure data exchange between component A and component B can be enabled.

The term "expected response token" may denote the expected shared secret of the Diffie-Hellman algorithm.

The term "supervisor session" may denote a session that is not bound to any user-related activities, but may be initiated and controlled by an intermediate layer process, e.g., of the firmware or a system process, e.g., a hypervisor. The intermediate layer may also prevent the user from opening supervisor sessions on its own.

In the following, a detailed description of the figures will be given. All instructions in the figures are schematic. Firstly, a block diagram of an embodiment of the inventive computer-implemented method for establishing identity-based hierarchical sessions on a hardware security module for binding secure keys to a guest system is given. Additionally, further embodiments, as well as embodiments of the session management system for establishing identity-based hierarchical sessions on a hardware security module for binding secure keys to a guest system, will be described.

Beginning now with FIG. 1, a block diagram of a preferred embodiment of the computer-implemented method 100 for establishing identity-based hierarchical sessions on a hardware security module for binding secure keys to a guest system, is depicted, according to at least one embodiment. The guest system may also be a plurality of guest systems and/or secure guest systems. At 102, the method comprises establishing a communication channel between the guest system and the HSM. Such a communication channel is identity-based, has end-to-end characteristics, and allows an encrypted data transfer when in use. Thus, enabling the sessions.

At 104, the method 100 comprises transferring login information/credentials, particularly, at least a PIN, and optionally, a Nonce (temporary value) and context data, of the guest system through the communication channel to the HSM. It may be noted that only the PIN requires a secure communication channel. The rest of the login information can be communicated through other channels.

At 106, the method 100 comprises maintaining a predefined security level throughout a hierarchy of the sessions. As a result, no child session has a higher security level than its parent session. Thus, child sessions have a lower or, at maximum, equal security level as their respective parent sessions. The applied security level may denote that the applied security protocols should be compliant to a predefined security standard.

At 108, the method 100 comprises performing a challenge-response protocol based on a session ownership verification with the guest system, such that an HSM-generated and secured key is bound to an associated guest system session. Thereby, the HSM sends the challenge message, and the guest system sends the required response together with the token, thus allowing a use of the session for, e.g., key generation purposes.

Referring now to FIG. 2, a block diagram of an embodiment 200 for establishing the secure communication channel is depicted. At 202, the guest system gets the "publicly" available key of the public/private key pair of the HSM.

At 204, the guest system uses its own private key and the received public key of the HSM to define a code, i.e., shared secret, to derive a symmetrical key, i.e., an encryption/decryption key which uses an identical key for a decryption and an encryption.

At 206, the guest system uses the symmetric key to encrypt login information/credentials, particularly, a login PIN, and sends it to the HSM. In addition, parameters like a Nonce, i.e., a random value, and/or context parameter values can be sent using the same route or through other communication channels as well.

At 208, the guest system sends its own public key, and optionally, the Nonce and the context parameter values, to the HSM.

At 210, the HSM applies the Diffie-Hellmann algorithm to derive the same code/shared secret. The code/shared secret is used to derive the symmetric key. The symmetric key is used to decrypt the PIN. In case of a match with a stored key, the secure communication channel has been established in a secure way.

Referring now to FIG. 3, a block diagram of a more implementation-near embodiment 300 of the present invention as physical components, is depicted according to at least one embodiment. The login initiator or initiating session component 306 provides PIN/login information via a common location channel to the HSM through communication channel 302. Through the described key exchange between the initiating session component 306 and the HSM, a secured communication channel has been enabled, i.e., the protected connection can be initiated. The established protected communication channel is based on an encrypted message transmission using identity-bound key material.

As a prerequisite, the public key 308A of the initiators session component 306 and the public key 308B of the HSM can be available within the underlying system(s).

Therefore, the secure communication channel 302 may have been established according to the activities described in the context of FIG. 2. Thus, based on a key exchange 310 to retrieve/decrypt initiators/connection-specific data, a session ID may be derived as a combination of initiator plus parent data plus context data, 312.

Thereby, as an example, the designated parent 314 of the hierarchy of sessions 304 and its data can be used to add another leave 316 on the hierarchy tree for the new session. Based on this, a challenge from the HSM may provoke a response 318, which flows through the secure communication channel 302, where the response may be reconstructed to a complete response 320 to the HSM challenge. This is possible only with access to data available to the initiator/importer. Based on this complete response 320, a session ownership verification check is possible to confirm the new session 316 in the hierarchy of the session/the identity assignments.

Referring now to FIG. 4, a block diagram of an embodiment of the session management system for establishing identity-based hierarchical sessions on a hardware security module for binding secure keys to a guest system, is depicted according to at least one embodiment. The system 400 comprises at least one or more processors 402 and a memory 404 operatively coupled to the one or more processors 402. Thereby, the memory 404 can store program code portions which, when executed by the one or more processors 402, can enable the one or more processors 402 to establish a communication channel between the guest system and the HSM, wherein the communication channel can be identity-based, end-to-end, and encrypted, thereby establishing a session. This activity can be performed by a communication channel establishment module 406.

The one or more processors 402 can also be enabled to transfer login information, in particular by a transfer unit 408, of the guest system through the communication channel to the HSM, and to maintain a predefined security level, in particular by a maintenance module 410 throughout a hierarchy of the sessions, wherein no child session has a higher security level than its parent session.

The one or more processors can also perform a challenge-response protocol, in particular, by a protocol execution unit, based on a session ownership verification with the guest system, such that an HSM-generated and secured key is bound to an associated session, in particular, an associated guest system session.

It shall also be mentioned that all functional units, modules, and functional blocks, particularly, the one or more processors 402, the memory 404, the communication channel establishment module, the transfer unit, the maintenance module, and the protocol execution unit 412, may be communicatively coupled to each other for signal or message exchange in a selected 1:1 manner. Alternatively, the functional units, modules, and functional blocks can be linked to a system internal bus system 414 for a selective signal or message exchange.

Various aspects of the present disclosure are described by narrative text, flowcharts, block diagrams of computer systems and/or block diagrams of the machine logic included in computer program product ("CPP") embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine-readable code corresponding to instructions and/or data for performing computer operations specified in a given CPP claim. A storage device is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory ("RAM"), read-only memory ("ROM"), erasable programmable read-only memory ("EPROM" or "Flash memory"), static random access memory ("SRAM"), compact disc read-only memory ("CD-ROM"), digital versatile disk ("DVD"), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 5, a computing environment 500 comprising an example of an environment for the execution of at least some of the computer code involved in performing the inventive methods, such as the computer-implemented method for establishing identity-based hierarchical sessions on a hardware security module for binding secure keys to a guest system 550.

In addition to block 550, computing environment 500 includes, for example, computer 501, wide area network ("WAN") 502, end user device ("EUD") 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface ("UI"), device set 523, storage 524, and Internet of Things ("IoT") sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory ("RAM") or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read-only memory ("ROM"), but typically at least a portion of the persistent storage allows writing of data, deletion of data, and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication ("NFC") connections, connections made by cables (such as universal serial bus ("USB") type cables), insertion type connections (e.g., secure digital ("SD") card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network ("SAN") that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (e.g., embodiments that utilize software-defined networking ("SDN")), the control functions and the forwarding functions of network module 515 are performed on physically separate devices, such that the control functions manage several different network hardware devices. Computer-readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks ("LANs") designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE ("EUD") 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer, and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments ("VCEs") typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments ("VCEs") will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

It should also be mentioned that the session management system 550 for establishing identity-based hierarchical sessions on a hardware security module for binding secure keys to a guest system can be an operational sub-system of the computer 501 and may be attached to a computer-internal bus system.

The terminology used herein is for the purpose of describing particular embodiments only and is not intended to limit the invention. As used herein, the singular forms a, an, and the, are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for establishing identity-based hierarchical sessions on a hardware security module (HSM) for binding secure keys to a guest system, the method comprising:
    establishing a communication channel between the guest system and the HSM, wherein the communication channel is identity-based, end-to-end, and encrypted, thereby establishing a session;
    transferring login information of the guest system through the communication channel to the HSM;
    maintaining a predefined security level throughout a hierarchy of sessions, wherein each child session does not have a higher security level than its parent session; and
    performing a challenge-response protocol based on a session ownership verification with the guest, such that an HSM-generated and secured key is bound to an associated session.

2. The method of claim 1, further comprising:
    transmitting a challenge of the challenge-response protocol via the communication channel from the HSM to the guest system.

3. The method of claim 1, wherein the establishing the communication channel is based on a public/private key pair of the HSM and a transmitted code allowing a symmetrical encryption/decryption key to be derived.

4. The method of claim 3, wherein the deriving the symmetrical encryption/decryption key is based on a Diffie-Hellman algorithm.

5. The method of claim 1, further comprising:
    using the communication channel to configure a new session to be a child session of an existing session such that the child session is cryptographically dependent on the parent session.

6. The method of claim 1, wherein the guest system is executed on a hypervisor.

7. The method of claim 1, wherein a function of a firmware of a computer system facilitates a communication between the guest system and the HSM.

8. The method of claim 1, further comprising:
    deallocating the communication channel and an associated state of the guest system and/or a related session.

9. The method of claim 1, further comprising:
    deallocating the session and an associated state of the guest system; and/or
    deallocating one or more child sessions that have been associated with a parent session upon deallocation of the parent session.

10. The method of claim 1, further comprising:
    marking a session as a supervisor session; and/or
    a separate interface for deallocating one or more sessions and their child sessions that have been marked as supervisor sessions.

11. The method of claim 1, further comprising:
    upon determining that a child session has a lower security level than its targeted parent session, rejecting a request to open the child session.

12. A session management system for establishing identity-based hierarchical sessions on a hardware security module (HSM) for binding secure keys to a guest system, the session management system comprising:
    one or more processors and a memory operatively coupled to the one or more processors, wherein the memory stores program code portions which, when executed by the one or more processors, enable the one or more processors to:
        establish a communication channel between the guest system and the HSM, wherein the communication channel is identity-based, end-to-end and encrypted, thereby establishing a session;
        transfer login information of the guest system through the communication channel to the HSM;
        maintain a predefined security level throughout a hierarchy of sessions, wherein each child session does not have a higher security level than its parent session; and
        perform a challenge-response protocol based on a session ownership verification with the guest, such that an HSM-generated and secured key is bound to an associated session.

13. The session management system of claim 12, wherein the one or more processors are further enabled to:
    transmit a challenge of the challenge-response protocol via the communication channel from the HSM to the guest system.

14. The session management system of claim 12, wherein the establishing the communication channel is based on a public/private key pair of the HSM and a transmitted code allowing a symmetrical encryption/decryption key to be derived.

15. The session management system of claim 14, wherein the deriving the symmetrical encryption/decryption key is based on a Diffie-Hellman algorithm.

16. The session management system of claim 12, wherein the one or more processors are further enabled to use the communication channel to configure a new session to be a child session of an existing session such that the child session is cryptographically dependent on the parent session.

17. The session management system of claim 12, further comprising:
    a hypervisor on which the guest system is executed.

18. The session management system of claim 12, wherein a function of a firmware of a computer system facilitates a communication between the guest system and the HSM.

19. The session management system of claim 12, wherein the one or more processors are further enabled to deallocate the communication channel and a related state of the guest system and/or a related session.

20. A computer program product for establishing identity-based hierarchical sessions on a hardware security module (HSM) for binding secure keys to a guest system, program instructions being executable by one or more computing systems or controllers to cause the one or more computing systems to:
    establish a communication channel between the guest system and the HSM, wherein the communication channel is identity-based, end-to-end, and encrypted, thereby establishing a session:

transfer login information of the guest system through the communication channel to the HSM:

maintain a predefined security level throughout a hierarchy of sessions, wherein each child session does not have a higher security level than its parent session; and perform a challenge-response protocol based on a session ownership verification with the guest, such that an HSM-generated and secured key is bound to an associated session.

* * * * *